(12) United States Patent
Isaka

(10) Patent No.: US 11,331,952 B2
(45) Date of Patent: May 17, 2022

(54) PNEUMATIC TIRE

(71) Applicant: Sumitomo Rubber Industries, Ltd., Kobe (JP)

(72) Inventor: Wataru Isaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 426 days.

(21) Appl. No.: 16/212,182

(22) Filed: Dec. 6, 2018

(65) Prior Publication Data

US 2019/0225019 A1 Jul. 25, 2019

(30) Foreign Application Priority Data

Jan. 19, 2018 (JP) .............................. JP2018-007494

(51) Int. Cl.
*B60C 9/26* (2006.01)
*B60C 9/22* (2006.01)
*B60C 9/18* (2006.01)

(52) U.S. Cl.
CPC .......... *B60C 9/1807* (2013.01); *B60C 9/2204* (2013.01); *B60C 9/263* (2013.01); *B60C 2009/2223* (2013.01); *B60C 2200/10* (2013.01)

(58) Field of Classification Search
CPC ..... B60C 9/26; B60C 9/263; B60C 2009/266; B60C 2009/2223; B60C 9/22; B60C 9/2204
See application file for complete search history.

(56) References Cited

U.S. PATENT DOCUMENTS

2017/0361656 A1* 12/2017 Kiebre .................. B60C 9/1807

FOREIGN PATENT DOCUMENTS

| DE | 2162402 | * | 10/1972 |
| DE | 2118748 | * | 11/1972 |
| DE | 2153774 | * | 5/1973 |
| DE | 2458275 | * | 6/1976 |
| EP | 101987 | * | 3/1984 |
| EP | 416893 | * | 1/1994 |
| FR | 1153397 | * | 3/1958 |
| JP | 03176206 | * | 7/1991 |
| JP | 2015-174569 | * | 10/2015 |
| JP | 2015-174569 A | | 10/2015 |

OTHER PUBLICATIONS

Machine translation of FR 1153397, 1958.*
Machine translation of DE 2162402, 1972.*
Machine translation of JP 2015-174569, 2015.*

* cited by examiner

*Primary Examiner* — Justin R Fischer

(74) *Attorney, Agent, or Firm* — Birch, Stewart, Kolasch & Birch, LLP

(57) ABSTRACT

A pneumatic tire comprises a mesh reinforcing layer formed from a tape wound circumferentially of the tire plural turns while repeating a zigzag unit comprising two inclined portion so that a number N of the repeated zigzag units are arranged while shifting in the tire circumferential direction and partly overlapping with each other. The amount of positional shift between the circumferentially adjacent zigzag units is in a range from 0.7 to 1.3 times a value of 360/N in terms of the angle α around the tire rotational axis.

16 Claims, 9 Drawing Sheets

PNEUMATIC TIRE

TECHNICAL FIELD

The present invention relates to a pneumatic tire having a tread reinforcing layer including a mesh reinforcing layer.

BACKGROUND ART

In general, a pneumatic tire provided in a tread portion with a belt layer and/or a band layer in order to reinforce the tread portion.

The belt layer is usually composed of two or more belt plies of reinforcing cords laid at, for example, an inclination angle of about 16 to 36 degrees with respect to the tire circumferential direction. In the belt layer, the reinforcing cords are crossed between the plies to increase the bending rigidity of the belt layer and thereby to enhance the maneuver stability, particularly the cornering performance.
On the other hand, since the reinforcing cords are cut at both edges in the tire axial direction of the belt plies, the binding force to the tread portion (hoop effect) is low, which is disadvantageous to the high speed running performance.

The band layer has a parallel structure in which the reinforcing cord angle with respect to the tire circumferential direction is substantially zero or very small. Such band layer can be formed by spirally winding one ore more reinforcing cords. Such band layer can exhibit a high binding force owing to the reinforcing cord(s) continuous in the circumferential direction, and thus, the tire is excellent in high-speed running performance. The band layer is low in the bending rigidity and the torsional rigidity as compared with the belt layer, therefore, the effect to improve the maneuver stability tends to become inferior to that of the belt layer.

In the following Patent Document 1, it has been proposed to form a band layer by winding band cords, which are embedded in rubber in the form of a tape, circumferentially of the tire in a zigzag manner plural times so that the band layer has a mesh structure.

In the mesh structure, however, if the size of the meshes is varied largely, the rigidity of the mesh structure becomes uneven in the ground contact patch of the tire, and it becomes difficult to ensure excellent maneuver stability.
Patent Document 1; Japanese Patent Application Publication No. 2015-174569

SUMMARY OF THE INVENTION

Problems to be Solved by the Invention

It is therefore, an object of the present invention to provide a pneumatic tire provided with a mesh reinforcing layer in which variations of meshes are suppressed, and thereby, the binding force is enhanced, and high-speed running performance and maneuver stability can be improved.

According to the present invention, a pneumatic tire comprises:
a tread reinforcing layer disposed radially outside a carcass in a tread portion,
the tread reinforcing layer including a mesh reinforcing layer formed from a tape of rubber in which a reinforcing cord or parallel reinforcing cords are embedded along its length, wherein in the mesh reinforcing layer, the tape is wound circumferentially of the tire plural turns while repeating a zigzag unit in the tire circumferential direction,
the zigzag unit comprises a first inclined portion, a second inclined portion, and a turning portion connecting therebetween,
in the first inclined portion, the tape extends from a first side edge on one side in the tire axial direction of the mesh reinforcing layer to a second side edge on the other side in the tire axial direction of the mesh reinforcing layer while inclining to one side in the tire circumferential direction,
in the second inclined portion, the tape extends from the second side edge to the first side edge of the mesh reinforcing layer while inclining to one side in the tire circumferential direction,
the mesh reinforcing layer comprises a number N of the repeated zigzag units arranged while shifting in the tire circumferential direction and partly overlapping with each other, and
the amount of positional shift in the tire circumferential direction between the circumferentially adjacent zigzag units is in a range from 0.7 to 1.3 times a value of 360/N in terms of the angle $\alpha$ around the tire rotational axis.

Further, the pneumatic tire according to the present invention may have the following features (1)-(5):
(1) the mesh reinforcing layer has parallelogram-shaped meshes formed by the first inclined portions and the second inclined portions of the zigzag units which intersect with each other, and the circumferential lengths of the meshes are gradually decreased from the axially inside to the axially outside of the tire;
(2) the angle $\theta 1$ of the first inclined portion with respect to the tire circumferential direction is in a range from 1 to 15 degrees, and the angle $\theta 2$ of the second inclined portion with respect to the tire circumferential direction is in a range from 1 to 15 degrees;
(3) the turning portion is a linear portion extending in the tire circumferential direction;
(4) in said zigzag unit to be repeated, the angle $\theta 1$ of the first inclined portion with respect to the tire circumferential direction is different from the angle $\theta 2$ of the second inclined portion with respect to the tire circumferential direction;
(5) the tread reinforcing layer includes the mesh reinforcing layer and a spiral reinforcing layer, wherein the spiral reinforcing layer is composed of one or more reinforcing cords spirally wound at a small angle with respect to the tire circumferential direction, and disposed adjacently in the tire axial direction to the mesh reinforcing layer.

According to the present invention, variations of the meshes, in particular variations in the circumferential length of the meshes, of the mesh-like reinforcing layer are suppressed, therefore, in the ground contact patch of the tire, the rigidity of the tread portion becomes uniform, and the binding force (high speed running performance) and maneuver stability can be improved.

DESCRIPTION OF PREFERRED EMBODIMENTS

Embodiments of the present invention will now be described in detail in conjunction with accompanying drawings.

Figure 1:
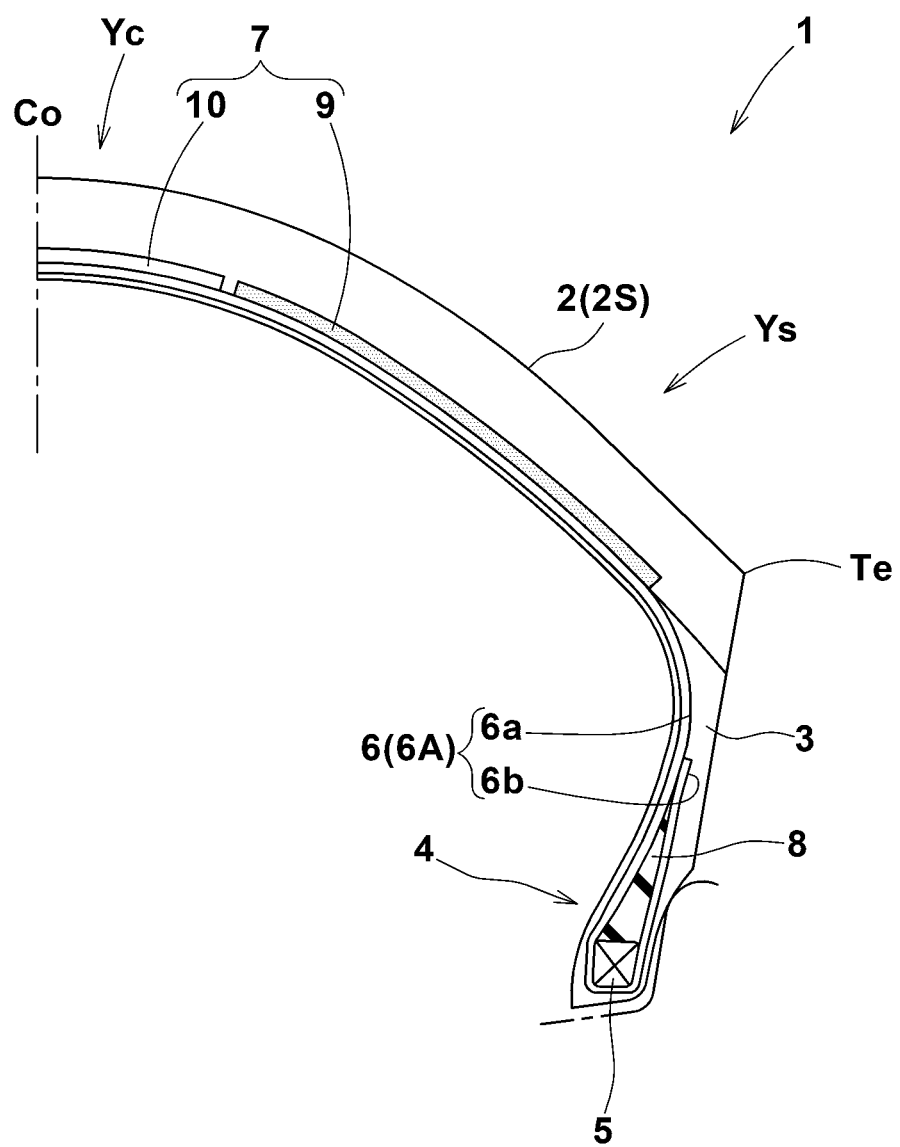
FIG. 1 is a cross-sectional view of a pneumatic tire as an embodiment of the present invention.

As shown in FIG. 1, a pneumatic tire 1 as an embodiment of the present invention comprises a tread portion 2, a pair of axially spaced bead portions 4 each with a bead core 5 therein, a pair of sidewall portions 3 extending between the tread edges Te and the bead portions, a carcass 6 extending between the bead portions 4 through the tread portion 2 and the sidewall portions 3, and a tread reinforcing layer 7 disposed radially outside the carcass 6 in the tread portion 2.

In this embodiment, the pneumatic tire 1 is a motorcycle tire. As a characteristic of a motorcycle tire, the tread portion 2 (inclusive of the carcass 6, tread reinforcing layer 7 and a tread rubber thereon) is convexly curved so that the tread face 2s between the tread edges Te is curved like an arc swelling radially outwardly, and the maximum cross sectional width of the tire 1 occurs between the tread edges Te.

The carcass 6 is composed of at least one ply, in this example only one ply 6A of cords arranged radially at an angle in the range of from 70 to 90 degrees with respect to the tire equator Co, extending between the bead portions 4 through the tread portion 2 and the sidewall portions 3 and turned up around the bead core 5 in each bead portion 4 from the axially inside to the axially outside of the tire to form a pair of turnup portions 6b and a main portion 6a therebetween.

Each of the bead portions 4 is provided between the carcass ply main portion 6a and turned up portion 6b with a bead apex rubber 8 extending radially outwardly from the bead core 5 in a tapered manner. The bead apex rubber 8 is made of a hard rubber, for example, having a durometer A hardness higher than 60 when measured at 23 degrees C. using a type A durometer in accordance with JIS-K 6253.

According to the present invention, the tread reinforcing layer 7 includes a mesh reinforcing layer 9.

In this embodiment, the tread reinforcing layer 7 further includes a spiral reinforcing layer 10.
The spiral reinforcing layer 10 is disposed in a crown region Yc of the tread portion 2, and the mesh reinforcing layer 9 is disposed in each shoulder region Ys adjacently to the spiral reinforcing layer 10.
The crown region Yc corresponds to the ground contacting patch of the tire when traveling straight.

The shoulder regions Ys extend toward both sides in the tire axial direction from the crown region Yc, and contact with the ground at the time of turning or cornering.

The spiral reinforcing layer 10 is formed by spirally winding a reinforcing cord or cords at an inclination angle of substantially zero with respect to the tire circumferential direction.

As to the reinforcing cords of the spiral reinforcing layer 10, although not particularly limited, reinforcing cords 11 which are the same as those of the mesh reinforcing layer 9 are suitably used. In particular, it is preferable to use the undermentioned tape 13 of rubber in which a single reinforcing cord or parallel reinforcing cords are embedded along the length thereof.

The mesh reinforcing layer 9 is formed by using the tape 13.

The tape 13 is a single reinforcing cord 11 or parallel reinforcing cords 11 embedded in the topping rubber 12 in the form of a long tape.

As to the reinforcing cords 11, high modulus cords such as steel cords and aramid fiber cords are preferably used.

Figure 2:
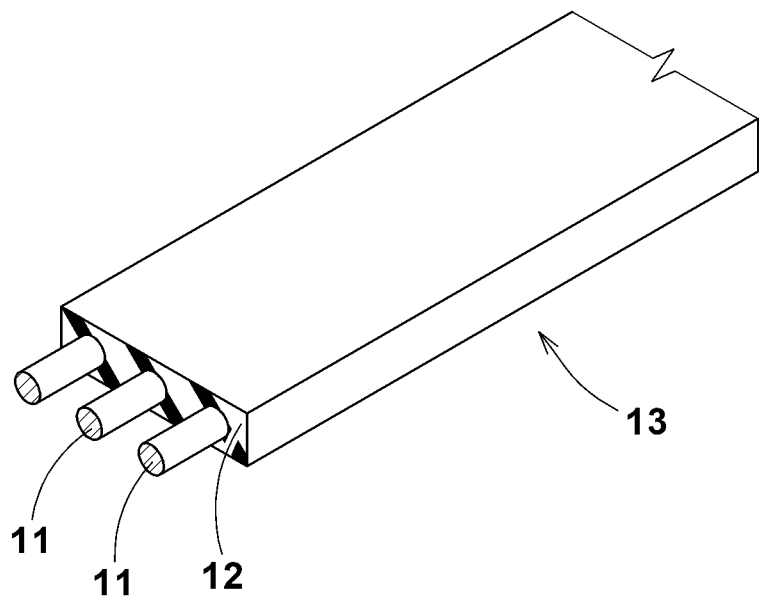
FIG. 2 is a perspective partial view of an example of the tape.

In this example, as shown in FIG. 2, a plurality of parallel reinforcing cords 11 are embedded in the rubber tape 13. The number of the reinforcing cords 11 embedded in the rubber tape 13 is preferably not more than 5, more preferably not more than 3 in order to smoothly winding the tape while bending the tape 13 in a zigzag manner.

In FIGS. 3 to 7, for the sake of simplicity, the tape 13 is illustrated by a single line.

Figure 8:
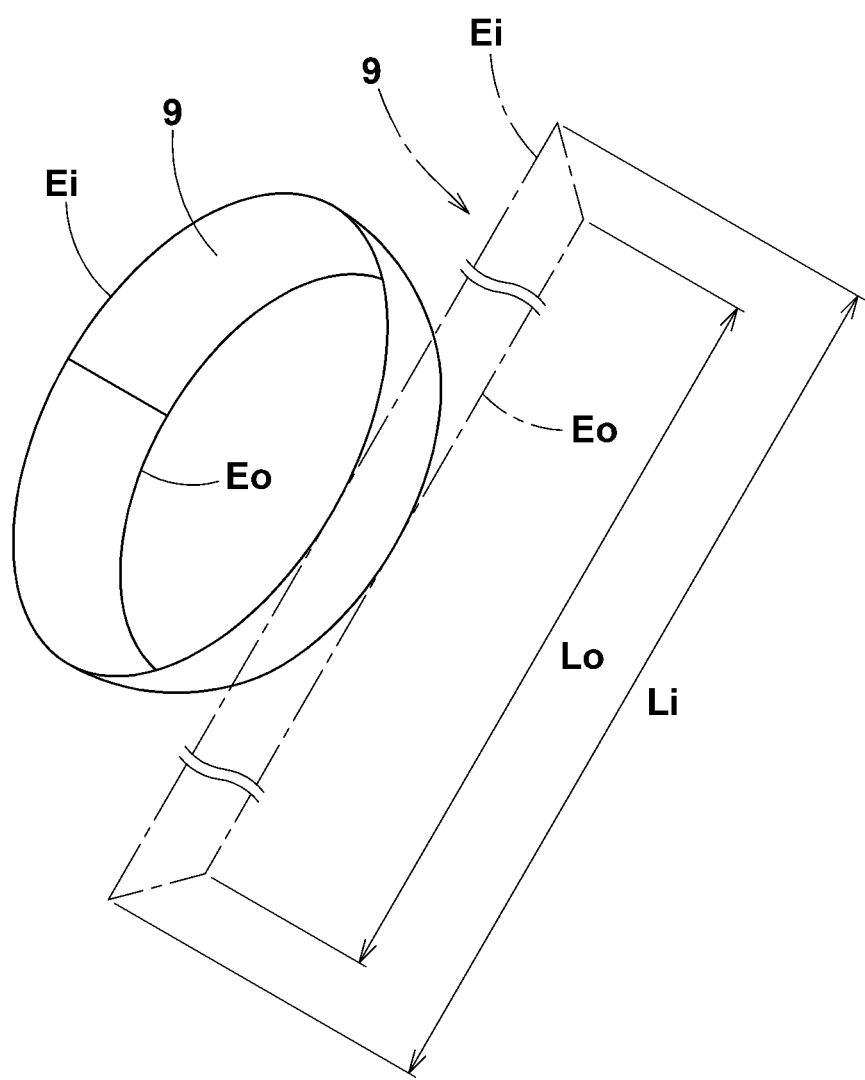
FIG. 8 is a perspective diagram showing one of the mesh reinforcing layers of the embodiment shown in FIG. 1 before (solid line) and after (chain line) developed.

In this embodiment, namely, motorcycle tire, due to the radius of curvature of the profile of the tread surface 2s, the difference between the circumferential length Li of the axially inner edge Ei and the circumferential length Lo of the axially outer edge Eo of the mesh reinforcing layer 9 is relatively large (Li>Lo), and
the mesh reinforcing layer 9 has a substantially trapezoidal shape when developed in a plane as schematically shown in FIG. 8.

Figure 3A:
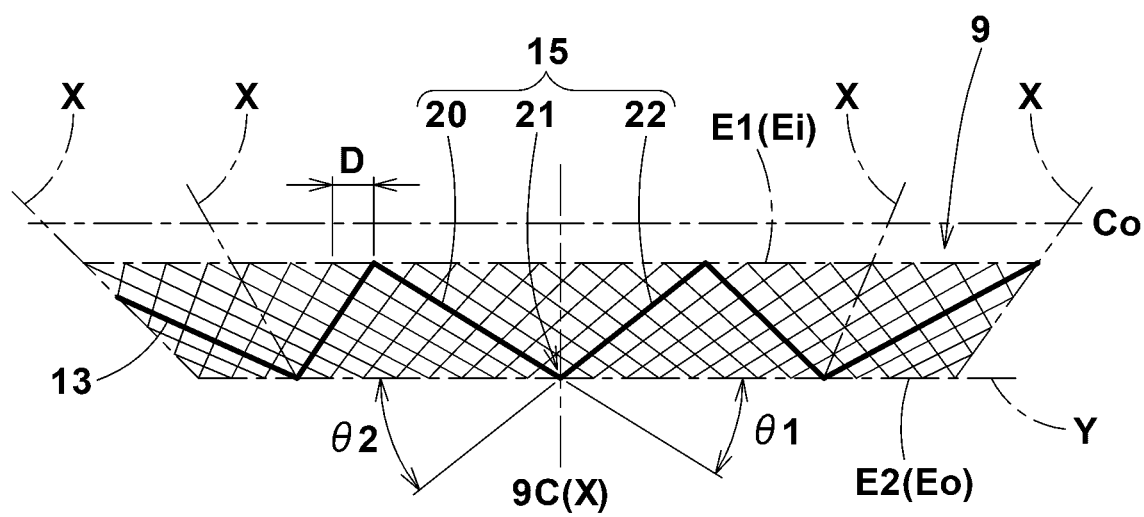
FIG. 3(A) is a schematic developed view of the mesh reinforcing layer.

In the mesh reinforcing layer 9, as conceptually shown in FIG. 3(A), the tape 13 is wound circumferentially of the tire several times, while repeating a V-shaped zigzag unit 15 several times. Thereby, the mesh reinforcing layer 9 is made up of a number N (23 in the figure) of the zigzag units 15 which are arranged while shifting their positions in the tire circumferential direction and partly overlapping with the previously arranged zigzag units 15.

The zigzag unit 15 is composed of a first inclined portion 20, a second inclined portion 22, and a turning portion 21 therebetween.

The first inclined portion 20 extends from a first side edge E1 of the mesh reinforcing layer 9 on one side in the tire axial direction to a second side edge E2 of the mesh reinforcing layer 9 on the other side in the tire axial direction, while inclining to one side F in the tire circumferential direction.

The second inclined portion 22 extends from the second side edge E2 to the first side edge E1 while inclining to the one side F in the tire circumferential direction.

The first inclined portion 20 and the second inclined portion 22 are continued via the turning portion 21.

Figure 7:
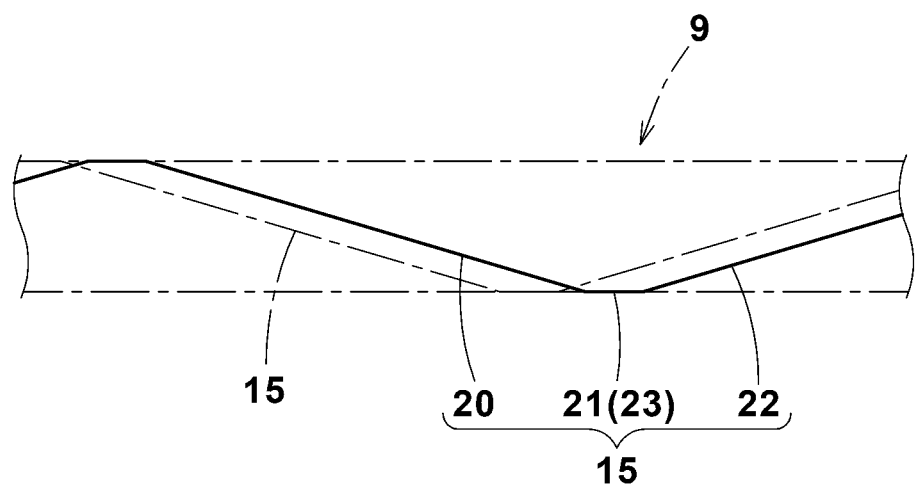
FIG. 7 is a diagram showing another example of the zigzag unit whose turning portion is a linear portion having a certain length.

The turning portion 21 may be a bent portion (having no substantial length), a straight portion 23 (having a certain linear length) extending in the tire circumferential direction as shown in FIG. 7, or a small arcuate curved portion (having a certain curved length) smoothly joining the portions 20 and 22.

FIGS. 4(A) to 4(H) show an example of a process of forming the mesh reinforcing layer 9 in which the tape 13 is wound eight turns.

Figure 4A:
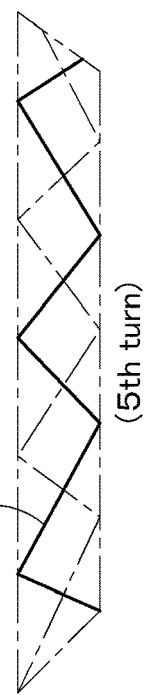
FIGS. 4(A) to 4 (H) are diagrams showing the winding state in each turn of the tape when forming the tread reinforcing layer.

FIG. 4(A) shows the winding state of the tape 13 in the first turn, in which the tape 13 is wound from an arbitrary position on the first side edge E1 while repeating the zigzag unit 15. Reference numeral 13a denotes a winding start end of the tape 13.

Figure 4B:
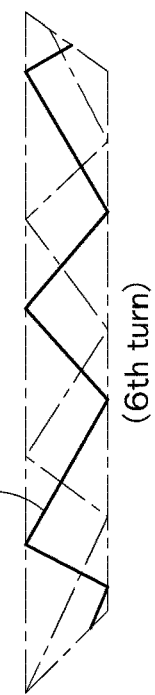
Figure 4C:
Figure 4D:
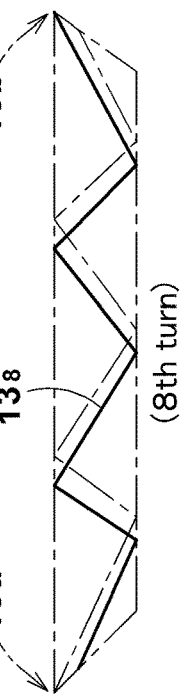
Figure 4E:
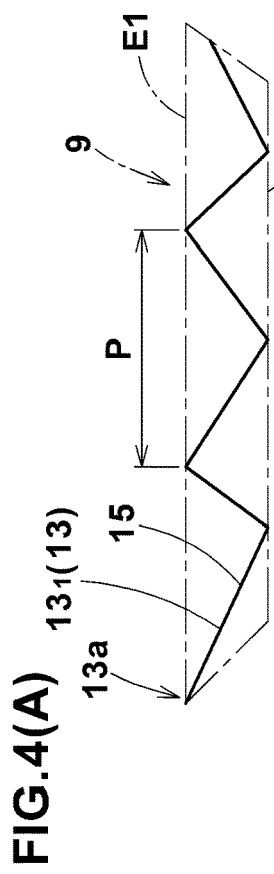
Figure 4F:
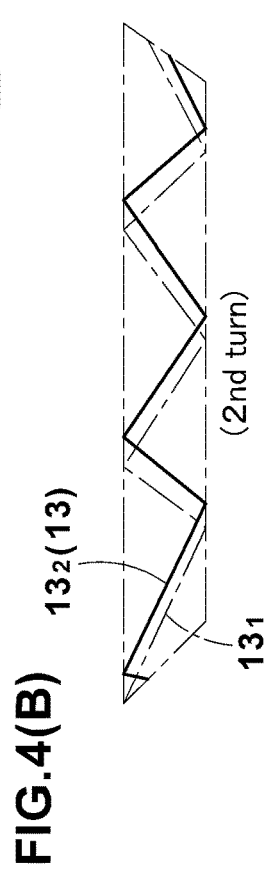
Figure 4G:
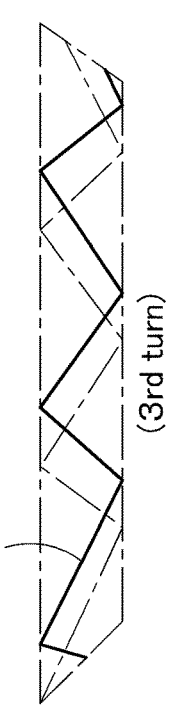
Figure 4H:

FIG. 4(B) shows the winding state of the tape 13 in the second turn, in which the tape 13 is wound continuously from the first turn while repeating the zigzag unit 15. At this time, the zigzag units 15 of the second turn $13_2$ is displaced in the tire circumferential direction from the zigzag units 15 of the first turn $13_1$.

In FIG. 4(B) to 4(H), the winding state of the first turn $13_1$ is indicated by a chain line for comparison.

FIGS. 4(C) to 4(H) show the winding state of the tape 13 in the third to eighth turns, respectively.

In the M-th turn, the tape 13 is wound continuously from the former (M−1)th turn while repeating the zigzag unit 15. At this time, the zigzag unit 15 of the M-th turn $13_M$ is shifted in the tire circumferential direction from the zigzag unit 15 of the (M−1)th turn $13_{M-1}$.

The position of the winding finish end 13b of the M-th turn $13_M$ coincides with the position of the winding start end 13a of the first turn $13_1$.

Here, when forming the mesh reinforcing layer 9, it is not always necessary to use a tape 13 which is continuous from the winding start end 13a to the winding finish end 13b.

It is possible to use plural tapes 13 jointed as if a long tape in the state wound into the mesh reinforcing layer 9. In this case, the "joint" method includes (1) the ends of the tapes 13 are overlap-jointed, (2) the ends of the tapes 13 are butt-jointed, and (3) the ends of the tapes 13 are confronted with each other with a small gap (for example, less than 5 mm). When plural tapes 13 are used, it is preferable that each tape 13 is continuous for at least two turns.

FIG. 4 shows only an example of the winding state of the tape 13. The present invention is not limited thereto. For example, the circumferential pitch length P (shown in FIG. 4(A)) of the zigzag unit 15 may be larger than the circumferential length of the mesh reinforcing layer 9, in which case one zigzag unit 15 is formed by more than one turn of the tape 13.

Figure 3B:
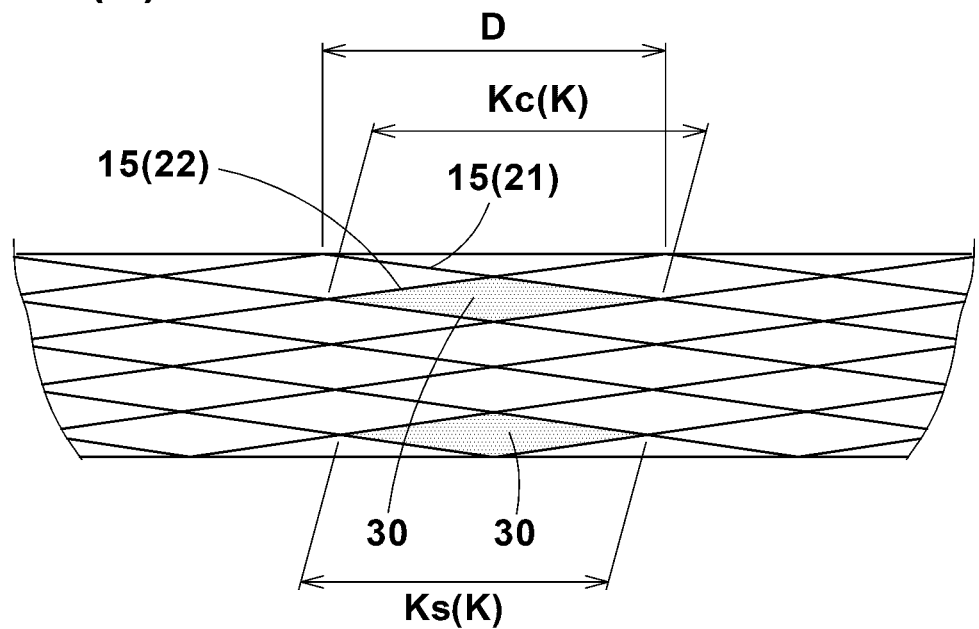
FIG. 3(B) is a schematic enlarged partial view of the mesh reinforcing layer.

In the mesh reinforcing layer 9, since the zigzag unit 15 is repeatedly arranged by shifting its position in the tire circumferential direction and partly overlapping with the previous ones, the first inclined portions 20 and the second inclined portions 22 of the zigzag units 15, which are intersected with each other, form parallelogram-shaped meshes 30 as shown in FIG. 3(B).

Figure 5:
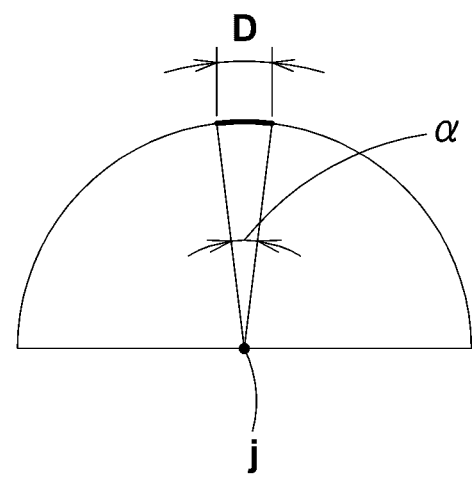
FIG. 5 is a diagram for explaining the amount D of a positional shift in the tire circumferential direction between the zigzag units adjacent in the tire circumferential direction which is expressed in terms of an angle α around the tire rotational axis.

In the present invention, the amount D of the positional shift in the tire circumferential direction between the zigzag units 15 adjacent in the tire circumferential direction is limited within a range from 0.7 to 1.3 times the value Dn of 360/N (degrees) as shown in FIG. 5.

This means that the amount D of the positional shift is expressed in terms of the angle α around the tire rotational axis, and that even if the positional shift amount D varies in the tire circumferential direction, the maximum value Dmax and the minimum value Dmin are limited to 1.3 times Dn and 0.7 times Dn, respectively.

This limitation should be satisfied at an arbitrary position in the tire axial direction of the mesh reinforcing layer 9.

By limiting the amount D in this manner, it is possible to suppress variations in the size of the meshes 30, in particular, variations in the circumferential length K of the meshes 30 along the tire circumferential direction. Thereby, the rigidity in the ground contact patch of the tire can be made uniform in order to secure excellent binding force (high speed running performance) and maneuver stability.

In the mesh reinforcing layer 9, the circumferential length K of the meshes 30 is gradually decreased toward the axially outer edge Eo from the axially inner edge Ei.

In a motorcycle tire, as the vehicle body is leant to turn, the tread edge portions are required to generate a large cornering force (centripetal force). Therefore, by making the meshes 30 denser toward the tread edges Te, the bending rigidity of the tread portion is increased toward the tread edges Te.

As a result, as the leaning angle of the tire increases, the bending rigidity is increased, and the maneuver stability at the time of turning or cornering can be improved.

The circumferential length Kc of the meshes 30 located adjacently to the axially inner edge Ei is preferably not more than 95%, more preferably not more than 90% of the circumferential length Ks of the meshes 30 located adjacently to the axially outer edge Eo The angle θ1 of the first inclined portion 20 and the angle θ2 of the second inclined portion 22 are preferably set in a range from 1 to 15 degrees with respect to the tire circumferential direction. By setting the angles θ1 and θ2 to such small values, it is possible to secure a high bending rigidity of the mesh reinforcing layer 9 in order to further enhance the binding force to the tread portion 2 while maintaining the excellent maneuver stability.

In each zigzag unit 15, the angles θ1 and θ2 can be set to be equal.

Incidentally, in the developed views of the mesh reinforcing layer 9 shown in FIGS. 3 to 4, due to the influence of Li>Lo, radial direction lines X (shown representatively in FIG. 3(A)) increase the inclination angles from the center 9C toward both sides in the tire circumferential direction. Accordingly, the distortion of the illustrated angles θ1 and θ2 are also increased from the center 9C toward both sides. However, in the actual mesh reinforcing layer 9, the angle θ1 and the angle θ2 are set to be equal.

Figure 6A:
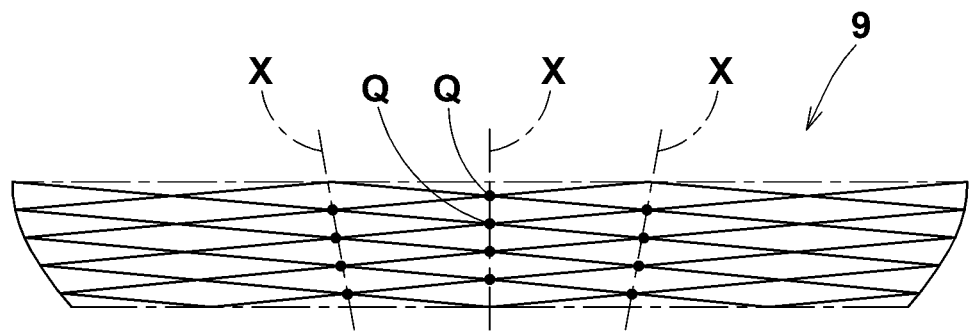
FIGS. 6(A) and 6(B) are diagrams for explaining the effect when the angle θ1 is different from the angle θ2.

In such mesh reinforcing layer 9, as shown in FIG. 6(A), there is a tendency that the intersections Q of the inclined portions 20 and 22 of the zigzag units 15 are aligned on the radial direction lines X.

At the intersections Q, the rigidity becomes locally higher since the tapes 13 overlap with each other. Therefore, when the intersections Q are aligned on the radial direction line x, the rigidity in the ground contact patch of the tire becomes uneven. As a result, the ground contacting property tends to deteriorated.

Figure 6B:
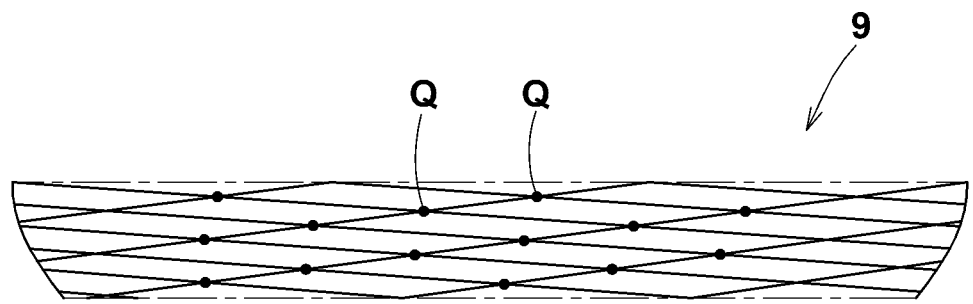

It is therefore, preferable to make the angle θ1 different from the angle θ2. Thereby, the intersections Q can be widely dispersed as shown in FIG. 6(B). Thus, the rigidity in the ground contact patch of the tire can be made even. In view of the dispersion, it is preferable that the difference |θ1−θ2| between the angles θ1 and θ2 is not less than 1 degrees, more preferably not less than 2 degrees, further preferably not less than 4 degrees.

FIG. 7 shows another example of the turning portion 21 of the zigzag unit 15, which is formed as a linear portion 23 of the tape extending in the tire circumferential direction.

In this example, since the bending angle of the reinforcing cord(s) 11 at the turning portion 21 becomes decreased to one half, the zigzag shape is stabilized when winding the tape, and further a possible strength reduction of the reinforcing cord(s) 11 due to bending can be suppressed.

It is preferable that the linear portion 23 of each zigzag unit 15 does not overlap with the circumferentially adjacent linear portion 23 of another zigzag unit 15.

As described above, in this embodiment, the spiral reinforcing layer 10 having a strong binding or hooping force can suppress an increase in the outer diameter of the tread portion 2 during high speed running, while keeping relatively low bending rigidity. Thus, the spiral reinforcing layer 10 can improve the ability of the tire to absorb disturbance from the road surface such as shocks and vibrations. Therefore, it becomes possible to suppress handlebar shimmy and exert high straight running performance in high speed running.

On the other hand, the mesh reinforcing layer 9 can secure a high binding force and a high bending rigidity, therefore, the maneuver stability at the time of turning or cornering, particularly during high speed running can be improved.

Figure 9A:
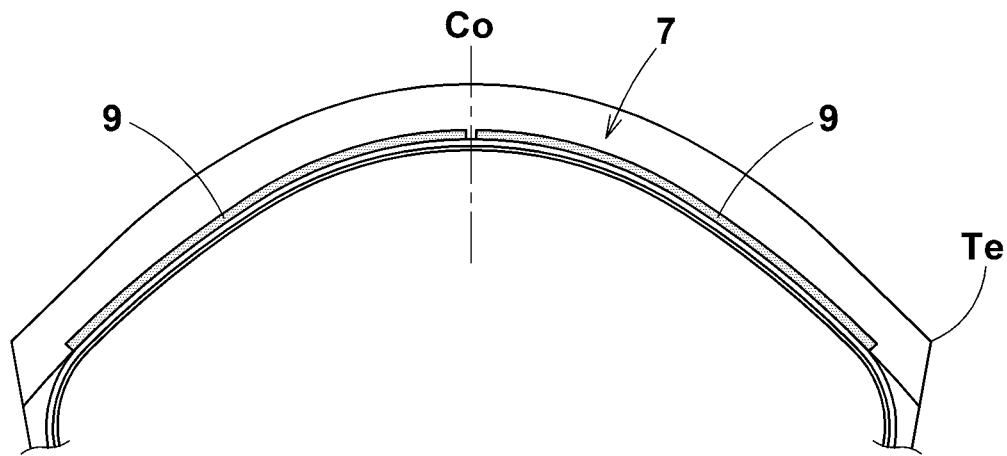
FIGS. 9(A) to 9(C) are cross-sectional views each showing another example of the tread reinforcing layer.
Figure 9B:
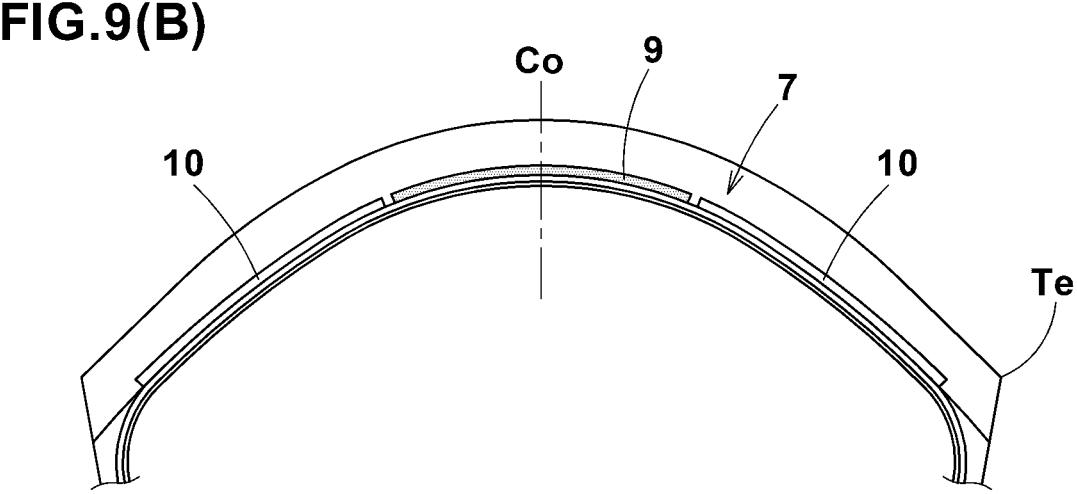
Figure 9C:
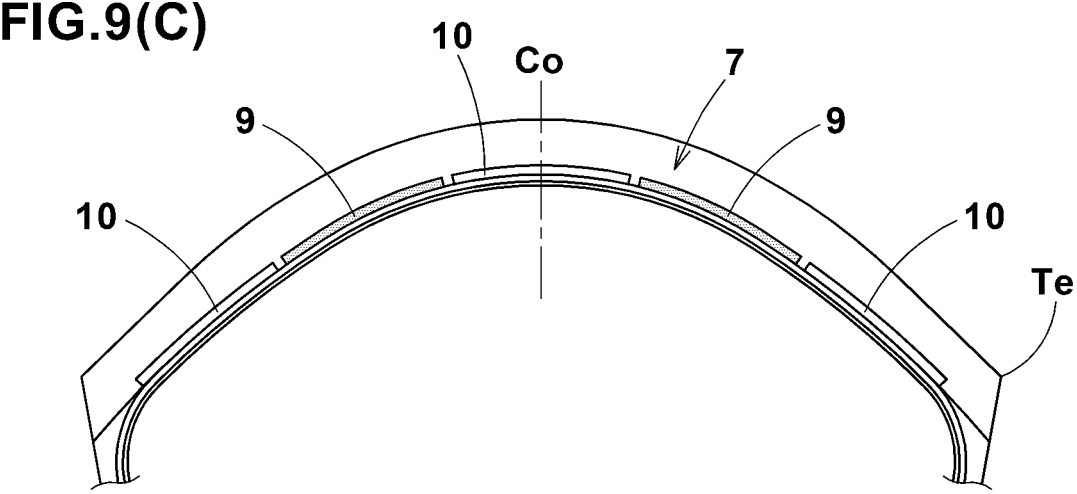

FIGS. 9(A)-9(C) each show another example of the tread reinforcing layer 7.

In FIG. 9(A), the tread reinforcing layer 7 is made up of only a pair of mesh reinforcing layers 9 arranged on both sides of the tire equator Co.

In FIG. 9(B), the tread reinforcing layer 7 is made up of a mesh reinforcing layer 9 disposed in the crown region of the tread, and a pair of spiral reinforcing layers 10 disposed in the shoulder regions of the tread portion.

In FIG. 9(C), the tread reinforcing layer 7 is made up of three spiral reinforcing layers 10 disposed on the tire equator Co and the tread edge sides, and a pair of mesh reinforcing layers 9 disposed between the spiral reinforcing layers 10.

Further, it is also possible that the tread reinforcing layer 7 (not shown) is made up of a single wide mesh reinforcing layer 9 extending over substantially the entire width of the tread portion.

While detailed description has been made of preferable embodiments of the present invention, the present invention can be embodied in various forms without being limited to the illustrated embodiments.

Comparison Tests

Motorcycle tires of size 207/70ZR17 were experimentally manufactured as test tires Ex1-Ex9, Ref1, Ref2, and Ref3.

The test tires Ex1-Ex9 and Ref3 had the tread reinforcing layers shown in FIGS. 1 and 9(A) to 9(C) as shown in Table 1.

The test tire Ref1 had the tread reinforcing layer which was a conventional belt layer composed of two plies of reinforcing cords arranged at an angle of 20 degrees with respect to the tire circumferential direction.

The test tire Ref2 had the tread reinforcing layer which was a conventional band layer formed by spirally winding a tape over substantially the entire width of the tread portion.

In order to form the mesh reinforcing layers and the spiral reinforcing layers, a tape (thickness 1.0 mm, width 4.0 mm) of rubber with three reinforcing cords (steel cords) embedded therein was used.

In each mesh reinforcing layer, the tape was continuous from the winding start end to the winding finish end.

In each spiral reinforcing layer, the tape was spirally wound circumferentially of the tire.

In the tread reinforcing layers shown in FIGS. 1, 9(B) and 9(C), the width of each spiral reinforcing layer used in combination with the mesh reinforcing layer(s) was 12 mm when measured along its surface.

Except for the tread reinforcing layers, the test tires had the same structure.

The specifications of the tread reinforcing layers are shown in Table 1.

The following comparison tests were carried out on the test tires.

<Circumferential Uniformity Test>

Each test tire was mounted on a wheel rim of size MT3.50×17M/C and inflated to 200 kPa. Then, using a tire test drum, the radial force variation (RFV) was measured under a load of 1.45 kN according to the test procedure for tire uniformity described in JASO 0607.

The measured values are indicated in Table 1 by an index based on Comparative test tire Ref1 being 100, wherein the larger the numerical value, the smaller the RFV, namely, the better the circumferential uniformity.

<Lateral Uniformity Test>

Each test tire was mounted on the front wheel (rim size MT3.50×17M/C, tire pressure 250 kPa) of a 1000 cc motorcycle on the rear wheel of which a commercially-available tire (size 180/55ZR17) was mounted. Then, during making turns along a 50 meter radius circle at a speed of 70 km/h, the test rider evaluated vibrations of the test tire seemed to be caused by the tread reinforcing layer into ten ranks, wherein the larger rank number is better. The results are shown in Table 1.

<Maneuver Stability Test>

Using the above-mentioned motorcycle, based on easiness and stability when leaning the motorcycle to initiate turn during running straight at a speed of 180 km/h and when making the motorcycle upright after turning, the test rider evaluated the maneuver stability into ten ranks, wherein the larger rank number is better. The results are shown in Table 1.

<Binding Force Test>

Each test tire mounted on a wheel rim of size MT3.50× 17M/C and inflated to 250 kPa was rotated under no load condition at a rotating speed corresponding to 270 km/h, and the outer diameter of the tire was measured to obtain the difference from the outer diameter of the tire not rotated.

The obtained differences are indicated in Table 1 by an index based on Comparative test tire Ref1 being 100, wherein the larger the numerical value, the smaller the difference, namely, the higher the binding effect.

TABLE 1

| Tire | Ref 1 | Ref 2 | Ex 1 | Ex 2 | Ex 3 | Ex 4 |
| --- | --- | --- | --- | --- | --- | --- |
| tread reinforcing layer (Fig. No.) | — | — | 9(A) | 9(A) | 9(A) | 9(A) |
| belt layer | present | absent | absent | absent | absent | absent |
| spiral reinforcing layer | absent | present | absent | absent | absent | absent |
| mesh reinforcing layer | absent | absent | present | present | present | present |
| variations of α/(360/N) | — | — | 1.0 | 0.7-1.1 | 0.9-1.3 | 1.0 |
| mesh length ratio Ks/Kc | — | — | 0.85 | 0.85 | 0.85 | 0.90 |
| angle θ1 (deg) | — | — | 5 | 5 | 5 | 5 |
| angle θ2 (deg) | — | — | 10 | 10 | 10 | 10 |

TABLE 1-continued

| | | | | | | |
|---|---|---|---|---|---|---|
| circumferential uniformity | 100 | 150 | 200 | 100 | 100 | 190 |
| lateral uniformity | 3 | 5 | 10 | 4 | 4 | 9 |
| maneuver stability | 5 | 3 | 10 | 9 | 10 | 8 |
| binding effect | 100 | 200 | 180 | 170 | 180 | 170 |
| Tire | Ex 5 | Ex 6 | Ex 7 | Ex 8 | Ex 9 | Ref 3 |
| tread reinforcing layer (Fig. No.) | 9(A) | 9(A) | 1 | 9(B) | 9(C) | 9(A) |
| belt layer | absent | absent | absent | absent | absent | absent |
| spiral reinforcing layer | absent | absent | present | present | present | absent |
| mesh reinforcing layer | present | present | present | present | present | present |
| variations of α/(360/N) | 1.0 | 1.0 | 1.0 | 1.0 | 1.0 | 0.6-1.4 |
| mesh length ratio Ks/Kc | 0.85 | 0.85 | 0.85 | 0.85 | 0.85 | 1.10 |
| angle θ1 (deg) | 1 | 7 | 5 | 5 | 5 | 7 |
| angle θ2 (deg) | 15 | 7 | 10 | 10 | 10 | 7 |
| circumferential uniformity | 180 | 180 | 160 | 200 | 160 | 70 |
| lateral uniformity | 8 | 7 | 9 | 8 | 8 | 3 |
| maneuver stability | 7 | 9 | 9 | 8 | 9 | 6 |
| binding force | 190 | 160 | 200 | 180 | 200 | 150 |

As apparent from the test results, it was confirmed that the tires according to the present invention can be improved in the binding force and maneuver stability.

DESCRIPTION OF THE REFERENCE SIGNS 1 pneumatic tire
2 tread portion
6 carcass
7 tread reinforcing layer
9 mesh reinforcing layer
10 spiral reinforcing layer
11 reinforcing cord
13 tape
15 zigzag unit
20 first inclined portion
21 turning portion
22 second inclined portion
23 linear portion
30 mesh
D amount of positional shift
E1 first side edge
E2 second side edge
j tire rotational axis

The invention claimed is:

1. A pneumatic tire comprising:
a tread reinforcing layer disposed radially outside a carcass in a tread portion,
the tread reinforcing layer including a mesh reinforcing layer formed from a tape of rubber in which a reinforcing cord or parallel reinforcing cords are embedded along its length,
wherein:
in the mesh reinforcing layer, the tape is wound circumferentially of the tire plural turns while repeating a zigzag unit in the tire circumferential direction,
the zigzag unit comprises a first inclined portion, a second inclined portion, and a turning portion connecting therebetween,
in the first inclined portion, the tape extends from a first side edge on one side in the tire axial direction of the mesh reinforcing layer to a second side edge on the other side in the tire axial direction of the mesh reinforcing layer while inclining to one side in the tire circumferential direction,
in the second inclined portion, the tape extends from the second side edge to the first side edge of the mesh reinforcing layer while inclining to said one side in the tire circumferential direction,
the mesh reinforcing layer comprises a number N of the repeated zigzag units arranged while shifting in the tire circumferential direction and partly overlapping with each other,
the amount of positional shift in the tire circumferential direction between the circumferentially adjacent zigzag units is in a range from 0.7 to 1.3 times a value of 360/N in terms of the angle α around the tire rotational axis,
the mesh reinforcing layer has parallelogram-shaped meshes formed by the first inclined portions and the second inclined portions of the zigzag units which intersect with each other, and
circumferential lengths of the meshes are gradually decreased from the axially inside to the axially outside of the tire.

2. The pneumatic tire according to claim 1, wherein
an angle θ1 of the first inclined portion with respect to the tire circumferential direction is in a range from 1 to 15 degrees, and
an angle θ2 of the second inclined portion with respect to the tire circumferential direction is in a range from 1 to 15 degrees.

3. The pneumatic tire according to claim 2, wherein
the turning portion is a linear portion extending in the tire circumferential direction.

4. The pneumatic tire according to claim 2, wherein
in said zigzag unit to be repeated, an angle θ1 of the first inclined portion with respect to the tire circumferential direction is different from an angle θ2 of the second inclined portion with respect to the tire circumferential direction.

5. The pneumatic tire according to claim 2, wherein
the tread reinforcing layer includes the mesh reinforcing layer and a spiral reinforcing layer,
the spiral reinforcing layer is made of one or more reinforcing cords spirally wound at a small angle with respect to the tire circumferential direction, and disposed adjacently in the tire axial direction to the mesh reinforcing layer.

6. The pneumatic tire according to claim 1, wherein
the turning portion is a linear portion extending in the tire circumferential direction.

7. The pneumatic tire according to claim 6, wherein
in said zigzag unit to be repeated, an angle θ1 of the first inclined portion with respect to the tire circumferential direction is different from an angle θ2 of the second inclined portion with respect to the tire circumferential direction.

8. The pneumatic tire according to claim 6, wherein
the tread reinforcing layer includes the mesh reinforcing layer and a spiral reinforcing layer,
the spiral reinforcing layer is made of one or more reinforcing cords spirally wound at a small angle with respect to the tire circumferential direction, and disposed adjacently in the tire axial direction to the mesh reinforcing layer.

9. The pneumatic tire according to claim 1, wherein
in said zigzag unit to be repeated, an angle θ1 of the first inclined portion with respect to the tire circumferential direction is different from an angle θ2 of the second inclined portion with respect to the tire circumferential direction.

10. The pneumatic tire according to claim 9, wherein
the tread reinforcing layer includes the mesh reinforcing layer and a spiral reinforcing layer,
the spiral reinforcing layer is made of one or more reinforcing cords spirally wound at a small angle with respect to the tire circumferential direction, and disposed adjacently in the tire axial direction to the mesh reinforcing layer.

11. The pneumatic tire according to claim 1, wherein
the tread reinforcing layer includes the mesh reinforcing layer and a spiral reinforcing layer,
the spiral reinforcing layer is made of one or more reinforcing cords spirally wound at a small angle with respect to the tire circumferential direction, and disposed adjacently in the tire axial direction to the mesh reinforcing layer.

12. The pneumatic tire according to claim 1, wherein
a plurality of the parallel reinforcing cords are embedded in the tape of rubber along the length thereof.

13. The pneumatic tire according to claim 1, which is formed as a motorcycle tire of which tread portion inclusive of the carcass, the tread reinforcing layer and a tread rubber thereon is convexly curved so that the tread face between tread edges is curved so that the maximum cross sectional width of the tire occurs between the tread edges.

14. The pneumatic tire according to claim 13, wherein
the mesh reinforcing layer is disposed on the carcass.

15. The pneumatic tire according to claim 1, wherein
the tread reinforcing layer is made up of only a pair of the mesh reinforcing layers disposed one on each side of the tire equator.

16. The pneumatic tire according to claim 15, wherein
a plurality of the parallel reinforcing cords are embedded in the tape of rubber along the length thereof.

\* \* \* \* \*